United States Patent [19]
Papa et al.

[11] 3,981,827
[45] Sept. 21, 1976

[54] POLYURETHANES CONTAINING BROMINATED CYCLOALIPHATIC ESTER POLYOLS

[75] Inventors: Anthony Joseph Papa, St. Albans, W. Va.; William Robert Proops, Wilmington, Del.

[73] Assignee: Union Carbide Corporation, New York, N.Y.

[22] Filed: Nov. 26, 1974

[21] Appl. No.: 527,431

Related U.S. Application Data

[62] Division of Ser. No. 231,751, March 3, 1972, Pat. No. 3,869,502.

[52] U.S. Cl. ................. 260/2.5 AN; 260/2.5 AV; 260/45.7 R
[51] Int. Cl.² ................. C08G 18/14; C08G 18/42
[58] Field of Search ............ 260/2.5 AP, 2.5 AN, 260/2.5 AV

[56] References Cited
UNITED STATES PATENTS

| | | | |
|---|---|---|---|
| 3,454,530 | 7/1969 | Case et al. | 260/2.5 AV |
| 3,459,733 | 8/1969 | Byrd et al. | 260/2.5 AV |
| 3,676,376 | 7/1972 | Svoboda et al. | 260/2.5 AV |
| 3,823,176 | 7/1974 | Levis et al. | 260/2.5 AV |

*Primary Examiner*—H.S. Cockeram
*Attorney, Agent, or Firm*—Marylin Klosty

[57] ABSTRACT

Provided as novel compositions are: (1) unsaturated cycloaliphatic ester polyols prepared by the reaction of a monounsaturated cycloaliphatic carboxylic acid anhydride, a polyhydric alcohol and an alkylene oxide, and (2) brominated derivatives of said polyols. The brominated cycloaliphatic ester polyols of the invention are useful as flame-retarding agents and are especially suitable for use in the manufacture of flame-retarded cellular polyurethanes including flexible foams.

16 Claims, No Drawings

POLYURETHANES CONTAINING BROMINATED CYCLOALIPHATIC ESTER POLYOLS

This is a division of application Ser. No. 231,751, filed Mar. 3, 1972, now U.S. Patent No. 3,869,502.

This invention relates to particular cycloaliphatic ester polyols and their use in the manufacture of polymeric materials including polyurethanes. In a more particular aspect, the invention relates to bromine-substituted cycloaliphatic ester polyols, their use as flame-retardants and to flame-retarded polymer compositions, especially flexible polyurethane foams, produced therewith.

It is well known to the art that polyurethane polymers are manufactured by the reaction of polyfunctional isocyanates and polyfunctional active hydrogen-containing compounds such as, in particular, polyethers and polyesters containing free hydroxyl groups, and that cellular products are provided by effecting the reaction in the presence of a blowing agent. Notwithstanding their many useful properties which have contributed to their acceptance in the transportation, building, household and textile industries, it is recognized that an objectionable characteristic of polyurethanes particularly when in cellular form, is their risk of flammability in applications where exposure to high temperatures and/or open flame may be encountered. This hazard also exists with respect to the use of other synthetic polymers including condensation polymers (such as, for example, thermosetting polyesters, polyepoxides and thermoplastic polyesters) and addition polymers (such as, for example, polypropylene and polyethylene). The problem of flammability has of course received considerable attention with the result that a variety of compounds which are largely phosphorus-containing compounds and halogen-substituted organic compounds, have been reported as flame-retarding agents.

As between various types of polymers including resinous coating compositions and cellular materials ranging from the open cell flexible foams to the closed and more highly crosslinked rigid foams, the flexible cellular polymers are inherently more difficult to flameproof without substantially upsetting the delicate balance between foam properties and open cell nature. A further factor which magnifies the difficulty in providing satisfactory flame-retarded flexible foams is that such foams generally exhibit a greater tendency to ignite at temperatures lower than the combustion temperatures of rigid foams. Thus, a particular compound which may be effective in reducing the flammability of rigid foams, may be too stable at lower temperatures to be an efficient flame-retardant of flexible cellular materials.

It is desirable to provide flame-retarding agents which are chemically reactive with other reactants or monomers employed in the manufacture of polymeric materials such that the flame-retardant becomes chemically combined in and an integral part of the polymer product. By using chemically reactive agents the disadvantages associated with additive flame-retardants such as loss by volatilization are avoided. Among the various types of reactive flame-retardants for polyurethane manufacture which are reported in the literature are bromo-alcohols wherein oxygen is present solely as ether or hydroxyl oxygen. Such compounds include: (1) 2,3-dibromopropanol ($CH_2BrCHBrCH_2OH$) which, in accordance with British patent specification Nos. 895,966 and 889,720, reduces flammability of polyurethanes when used either as such or in combination with antimony oxide; (2) 2,2-bis(bromomethyl)-1,3-propanediol, also known as dibromoneopentyl glycol and having the formula $(HOCH_2)_2C(CH_2Br)_2$, to which British patent specification No. 1,063,605 relates; and (3) the particular brominated ether alcohols reported in U.S. Pat. No. 3,252,922 having $—CHBrCHBrCH_2—O—$ or $—CHBr—CH_2—O—$ groups as the sole brominated sites, such compounds being exemplified by 2,3-dibromobutanediol-1,4-mono-2-hydroxyethyl ether which has the formula, $HOCH_2CHBrCHBrCH_2—O—CH_2CH_2OH$. A common structural feature of each of the aforesaid acyclic compounds is that bromine is bonded to a carbon atom which is no further removed than the gamma-position to ether or hydroxyl oxygen. This may be due to the belief that ability of such bromo-alcohols to impart a degree of flame-retardancy requires that bromine be bonded to carbon atoms which are in the aforementioned close proximity to either ether or hydroxyl oxygen. Of these various bromo-alcohols, the aforementioned dibromoneopentyl glycol possesses good efficiency as a flame-retardant of flexible polyether urethane foams and provides foams which are generally of satisfactory quality. A major drawback, however, of this compound in its use as a flame-retardant of polyurethane foams is that it is a solid material (melting point 109°–110°C.) and does not, therefore, offer the processing advantages of normally liquid flame-retarding agents.

Another group of compounds reported as useful in reducing the flammability of polyurethanes are the ester-containing polyols to which U.S. Pat. No. 3,585,185 relates. Such polyols are prepared by the reaction of alkylene oxide condensates of polyhydric alcohols, a halogen-containing organic acid anhydride and an alkylene oxide. Of the various anhydride reactants, the only brominated compound disclosed is tetrabromophthalic anhydride. We have found that such ester-containing polyols derived from tetrabromophthalic anhydride are inefficient flame-retarding agents for flexible polyurethane foams in that they do not provide foams which qualify as self-extinguishing materials by flammability test ASTM D-1692-67 T when used in amounts sufficient to provide the polymer with bromine contents as high as about 4.5 weight per cent.

It is desirable, therefore, and is a primary object of this invention to provide a particular class of ester polyols which are useful either as flame-retarding agents or in the formation of flame-retarding agents.

A further object is to provide novel flame-retardants comprising bromine-substituted ester polyols which are useful in the formation of flame-retarded cellular polyurethanes, particularly flexible foams, of good overall physical and mechanical properties and which offer the further advantages of being normally liquid and compatible with various components employed in the production of polyurethanes.

Various other objects and advantages of the present invention will become apparent to those skilled in the art from the accompanying description and disclosure.

In accordance with one aspect of the present invention two classes of novel compositions are provided, namely, (1) unsaturated cycloaliphatic ester polyols formed as the products of the method which comprises reacting a monounsaturated cycloaliphatic carboxylic acid anhydride which is free of halogen substitution, a polyhydric alcohol and an alkylene oxide, and (2) corresponding saturated brominated derivatives of (1). The compositions of the present invention comprise at least one compound including mixtures of compounds encompassed by the following general Formula I:

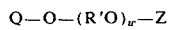  (I)

wherein:

R' represents a bivalent alkylene radical having from 2 to 10 carbon atoms;

w represents a number having an average value of from about one to about 15;

Z represents hydrogen or a second Q radical; and

Q represents a monounsaturated or dibromosubstituted saturated cycloaliphatic nucleus having one carbon atom bonded to a carbonyl group which in turn is bonded to oxygen of said —O—(R'O)$_w$—Z group to form an ester linkage, a second, adjacent carbon atom of said cycloaliphatic nucleus being bonded to an oxyalkylated carboxylic acid ester group.

In accordance with a more specific embodiment of the cycloaliphatic ester polyols of the present invention, the preferred structure of Q is as shown by the following Formula I-a:

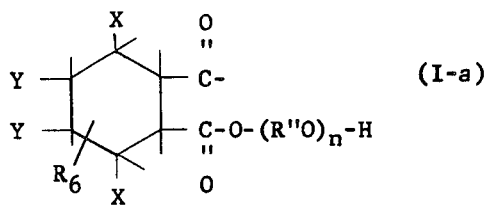

wherein:

R represents hydrogen or an alkyl radical having from 1 to 6 carbon atoms;

Y individually, represents bromine and, collectively, represent a second bond between the adjacent carbon atoms;

X individually, represents R (that is, hydrogen or an alkyl radical having from 1 to 6 carbon atoms) and, collectively, represent a methylene bridge, —CR$_2$—, between the opposing carbon atoms, R being as aforesaid;

R'' represents a bivalent alkylene group having from 2 to 10 carbon atoms; and n represents a number having an average value of from about 0.1 to about 10, preferably from about 0.5 to about 6.

When Z of Formula I is hydrogen, the composition of the present invention comprise a diester diol having the average formula,

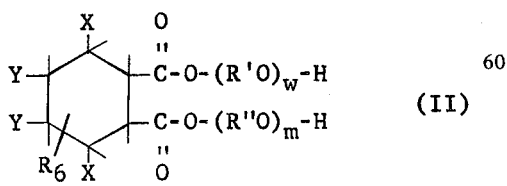

and, when Z is a second Q radical, the compositions comprise a tetraester diol having the average formula,

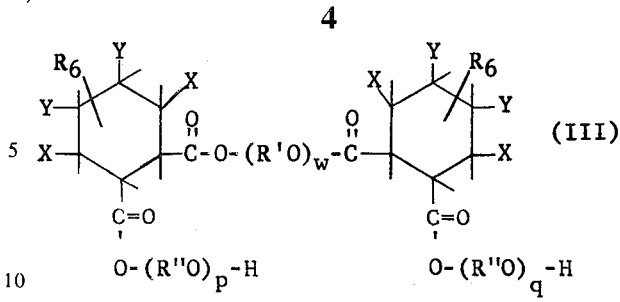

wherein Y, X, R, R', R'' and w are as previously defined, and m and the sum p+q may each have an average value of from about 0.1 to about 10, their collective value (that is, the sum m+p+q) also being within this same range. Thus, when the polyester polyol compositions of the present invention consist essentially of the diester diols having Formula II above, the value of m is substantially the same as the value of n defined with specific reference to Formula I-a. Similarly, when the compositions consist essentially of the tetraester diols having Formula III above, the value of p+q is substantially the same as the value of n. When the novel compositions of the present invention are provided as mixtures of the diester and tetraester diols encompassed by Formulas II and III, m, p and q are positive numbers and the sum m+p+q is no greater than about 10.

The novel polyester polyol compositions of this invention are useful in the formation of polymers by the reaction of their hydroxyl groups with functional groups of other polymer-building units such as, for example, isocyanato groups of organic polyisocyanates to form polymers having urethane linkages, and carboxylic acid groups of aliphatic and aromatic acid-containing materials to form polymers having ester linkages. The compositions encompassed by Formulas I–III in which the two Y radicals taken together form a second bond between adjacent carbon atoms of the cycloaliphatic nucleus, are also useful as the starting materials for producing the novel corresponding vicinal bromides of the present invention (that is, the cycloaliphatic ester polyols encompassed by Formulas I–III wherein each Y group bonded to the cyclic nucleus represents a bromine atom).

In accordance with another aspect of the present invention, the flammability of polymers normally susceptible to burning is reduced by the incorporation therein of a flame-retarding agent comprising the novel bromo-cycloaliphatic ester polyols described herein, namely, compounds encompassed by Formula I wherein Q has the formula

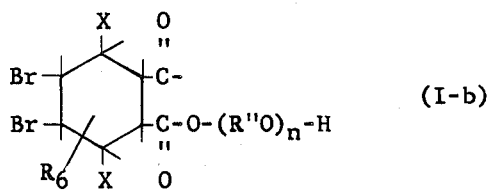

and X, R, R'' and n are as previously defined. In accordance with one embodiment of this aspect of the present invention, flame-retarded polyurethanes are provided by the reaction of: (1) an organic polyisocyanate, (2) the bromo-cycloaliphatic ester polyols described herein, and (3) an additional polyol containing an average of at least two hydroxyl groups per molecule such as, in particular, polyether polyols and polyester polyols. In producing the flame-retarded urethane polymers of this invention, the bromo-cycloaliphatic ester polyol flame-retardant may be employed as such or as a prepolymer containing free isocyanato groups formed by prereaction of the flame-retardant with an organic polyisocyanate. The polyurethanes of the present invention may be produced as flexible, semi-flexible or rigid foams (i.e., cellular polyurethanes), flexible and stiff fibers, coatings, films, elastomers and the like. When cellular polyurethanes are desired, the reaction of (1), (2) and (3) is effected in the presence of a blowing agent as an additional component of the reaction mixture.

The novel bromine-substituted ester polyols of the present invention exhibit a particularly desirable combination of properties as flame-retarding agents of cellular polyurethanes, especially flexible foams. For example, in addition to being normally liquid materials, they are compatible with components normally present in polyurethane-forming reaction mixtures such as, for example, polyether polyols. They are, therefore, readily amenable for use in the widely employed "one-shot" or single stage process for producing flexible polyurethane foams. It is also found that the flame-retarding agents of this invention allow for the formation of flexible polyurethane foams which are self-extinguishing (by flammability test ASTM D-1692-67 T) and of overall good quality.

In preparing the novel ester polyols of the present invention, a monounsaturated cycloaliphatic carboxylic acid anhydride reactant is employed in which the carbon atoms of the anhydride grouping are bonded to a cyclohexenyl or a bicycloheptenyl nucleus. The preferred anhydride reactants are compounds having the formula,

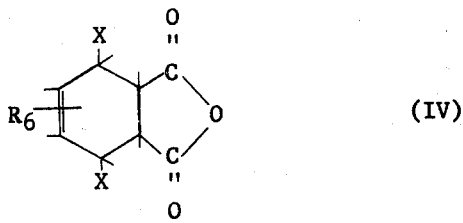

(IV)

wherein, as previously defined with respect to the Q radical (Formula I-a) of the novel compositions of this invention, R is hydrogen or an alkyl radical having up to 6 carbon atoms including linear and branched radicals, and each X is R or, taken together, both X's represent a methylene bridge ($-CR_2-$) between opposing carbon atoms. Illustrative of suitable alkyls encompassed by the R, X, and $-CR_2-$ groups of Formulas I-IV are methyl, ethyl, n-propyl, isopropyl, n-butyl, isobutyl, pentyl and hexyl radicals of which lower alkyls are preferred. As used herein, the term "lower alkyl" denotes an alkyl radical having from 1 to 4 carbon atoms. It is to be understood that the R radicals bonded to the cycloaliphatic nucleus may be the same as or different from one another and that any combination thereof may be present. Preferably, no more than four of the total of eight R groups which may be bonded to the cyclic nucleus of the anhydride reactant are alkyl groups.

Suitable unsaturated carboxylic acid anhydrides for use in preparing the novel ester polyols of the present invention are: the unsubstituted and alkyl-substituted tetrahydrophthalic anhydrides including the $\Delta^1$-, $\Delta^2$- and $\Delta^4$-isomers thereof; and the unsubstituted and alkyl-substituted bicycloheptenyl-2,3-dicarboxylic anhydrides. Typical examples of the anhydride reactant are one or more of the following: 3,4,5,6-tetrahydrophthalic anhydride; 1,4,5,6-tetrahydrophthalic anhydride; 1,2,3,6-tetrahydrophthalic anhydride, commonly referred to simply as tetrahydrophthalic anhydride; 4-methyl-tetrahydrophthalic anhydride; 4,5-dimethyl-tetrahydrophthalic anhydride; bicyclo[2.2.1]hept-5-ene-2,3-dicarboxylic anhydride; and methylbicyclo[2.2.1]hept-5-ene-2,3-dicarboxylic anhydride.

The polyhydric alcohol reactant employed in producing the novel ester polyols of this invention is the source of the $-R'-$ group of the compositions depicted by Formulas I-III and has the general formula, $HO-(R'O)_w-H$, wherein: $R'$ is a bivalent alkylene radical having from 2 to 10, and usually no more than 6, carbon atoms; and the average value of $w$ is from 1 to about 15 and is usually no more than about 8. It is to be understood that the $R'$ group may be a linear or branched unsubstituted or hydroxyl-substituted alkylene group and that the hydroxyl groups of this reactant may be primary, secondary or tertiary. Illustrative of suitable polyhydric reactants are one or more of the following: ethylene glycol, propylene glycol, trimethylene glycol, 1,2-, 1,3-, 1,4- and 2,3-butanediols, 2,4-pentanediol, 1,5-pentanediol, 2,3-dimethyl-2,3-butanediol, 2-methyl-2,4-pentanediol ("hexylene glycol"), glycerin, 1,2,6-hexanetriol, diethylene glycol, triethylene glycol, tetraethylene glycol and dipropylene glycol, and polypropylene glycols having the formula, $HO-CH_2(CHCH_3-O-CH_2)_e-CHCH_3-OH$, wherein the average value of $e$ is from about 2 to about 14.

The third type of reactant employed in producing the novel compositions of this invention is an alkylene oxide. This reactant is the source of the $-(R''O)-$ units of Formulas I-III and thus, for convenience, may be shown as OR'' wherein the oxy group bridges two carbon atoms of the bivalent alkylene group, R'', which as above-defined has from 2 to 10 carbon atoms. The preferred alkylene oxides for use in preparing the cycloaliphatic ester polyols encompassed by Formulas I-III are the vicinal epoxides including those in which the two adjacent carbon atoms bridged by the oxy group are terminal or non terminal carbon atoms, such as the alkylene oxides having the structure,

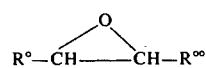

wherein $R°$ and $R^{\infty}$ represent hydrogen or an alkyl radical having from 1 to 8 carbon atoms, and may be the same or different, and $R^{\infty}$ may additionally be a phenyl radical, it being understood that when both $R°$ and $R^{\infty}$ are other than hydrogen, the combined number of carbon atoms present therein is no greater than 8. Illustrative of suitable alkylene oxide reactants are: ethylene oxide, propylene oxide, 1,2-, 1,4- and 2,3-butylene oxides, 2,3-epoxypentane, 3,4-epoxyhexane, 2,3-epoxyheptane and other such epoxy-pentanes, -hexanes, -heptanes . . . -decanes, inclusive; and styrene oxide. It is to be understood that in producing the cyclo aliphatic ester polyols of the present invention, more than one alkylene oxide may be employed. Especially preferred are ethylene oxide and propylene oxide used individually or in combination.

The reaction of the above-described acid anhydride, polyhydric alcohol and alkylene oxide reactants is effected generally at a temperature between about 90°C. and about 165°C. and usually at a temperature no higher than about 150°C. In accordance with preferred operation, the anhydride is initially coreacted with polyhydric alcohol to form an intermediate acidic reaction product which is then oxyalkylated to provide the unsaturated ester polyols of the present invention. The initial reaction involving opening of the anhydride ring provides a simple half-ester mono-ol and may be accompanied by further reaction of a portion or substantially all of the mono-ol with additional anhydride to form a bis-(half ester)-dicarboxylic acid. These reactions are illustrated by the following equations (1) and (2) wherein the simple half-ester mono-ol is designated "A", the bis-(half ester)-dicarboxylic acid is designated "B", and R, X, R' and w are as previously defined.

Equation (1):

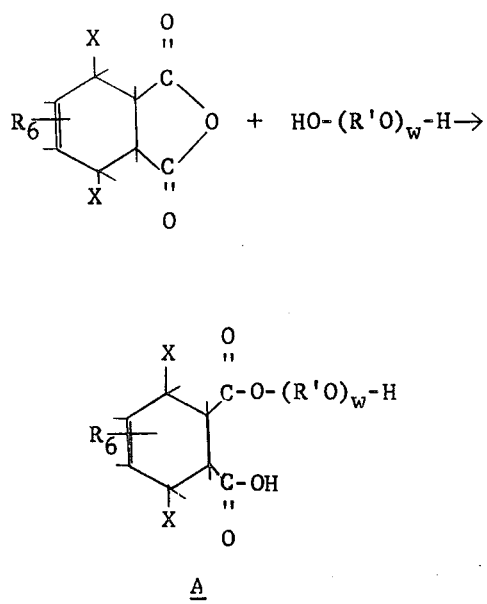

Equation (2):

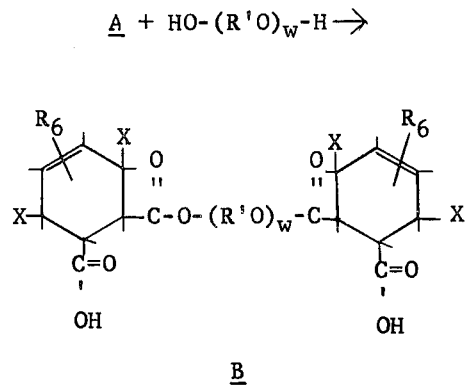

The relative proportion of polyhydric alcohol and anhydride employed may vary over a relatively wide range such as from about 1 to about 15 mols of polyhydric alcohol per mol of anhydride. From the standpoint of solubilizing at least a portion of the acidic intermediates and facilitating mixing of the reaction mixture, it is usually preferred practice to employ the polyhydric alcohol in excess of stoichiometric requirements. Usually, between about 1.2 and about 2 mols of polyhydric alcohol are employed per mol of anhydride, although more than a 100 per cent molar excess may be present without departing from the scope of the invention.

The initial reaction is usually effected by heating a mixture of the anhydride and polyhydric alcohol to a temperature between about 115°C. and about 130°C., although the exotherm of the reaction may cause the reaction mixture to reach temperatures as high as about 165°C. In order to minimize esterification of the free-acid groups by condensation with polyhydric alcohol and thereby avoid formation of high molecular weight product of low hydroxyl number, the temperature is substantially prevented from rising above about 130°C. In view of the exothermic nature of the anhydride-polyhydric alcohol reaction, the reaction temperature may be maintained within the aforesaid range by cooling, adding either reactant to the reaction zone at a controlled rate, effecting the reaction in dilute phase or by other such conventional techniques. A satisfactory rate of reaction is realized by effecting the reaction of the anhydride and polyhydric alcohol at substantially atmospheric pressure, although the reaction may be carried out under an elevated pressure such as, for example, up to about 200 p.s.i.g., without departing from the scope of this invention.

The opening of the anhydride ring by reaction with polyhydric alcohol may be effected with or without the presence of a catalyst. Included within the scope of suitable catalysts which may be employed are any of the basic compounds and organotin compounds described below with reference to the oxyalkylation reaction. Of these various catalysts, organotin compounds such as stannous octoate, are especially suitable promoters of the anhydride-polyhydric alcohol reaction. Although catalyst need not be separated from the intermediate reaction product, it is preferred practice to remove any excess polyhydric alcohol prior to introducing alkylene oxide to the reaction zone.

The intermediate acidic product formed by the reaction of anhydride and polyhydric alcohol is reacted with alkylene oxide to provide the novel unsaturated ester diols of the present invention. Thus, oxyalkylation of the simple half-ester mono-ol (A) of the equation (1) and the bis-(half-ester)-diacid (B) of equation (2) either individually or in admixture, provides the corresponding diester-diols and tetraesterdiols encompassed by Formulas II and III above. These reactions are illustrated by the following equations (3) and (4) in which, for convenience, the diester and tetraester diols are designated as A' and B', respectively:

Equation (3):

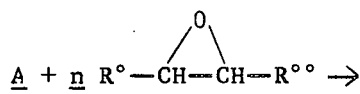

-continued

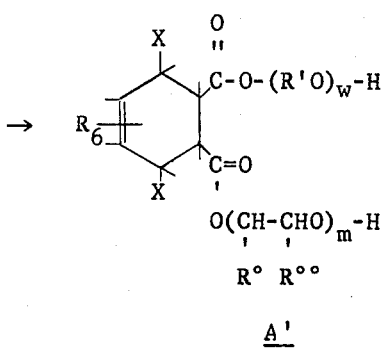

Equation (4):

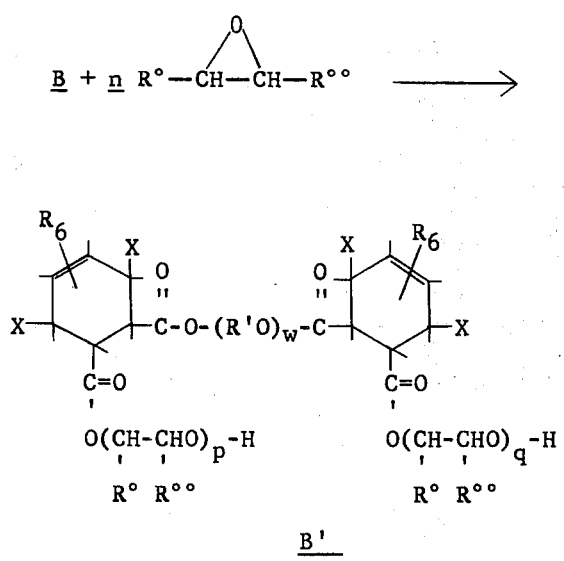

wherein R°, R°°, R, X, R', n and w are as above-defined and the average value of each of m and the sum p+q is about equal to the average value of n. It is to be understood that, included within the scope of the present invention, is the oxyalkylation of a mixture of A and B which may be present in any relative proportions, to produce a mixed diester-tetraester diol reaction product suitable for use in providing the novel bromine-substituted flame-retarding agents of the present invention. In providing such mixtures of diester diol A' and tetraester diol B' by reaction of a mixture of A and B with n mols of alkylene oxide, the oxyalkylation reactions illustrated by equations (3) and (4) proceed substantially concurrently and the average value of the sum m+p+Q is also about the same as the value of n.

Generally, the oxyalkylation reaction is carried out at a temperature between about 90°C. and about 150°C., and more usually at a temperature between about 110°C. and about 125°C. Although the reaction proceeds at substantially atmospheric pressure, the rate of reaction is enhanced by operating at a pressure above atmospheric such as elevated pressures up to about 200 p.s.i.g.

The relative proportion of alkylene oxide employed in any particular reaction depends largely on the average number of oxyalkylene units desired in the final product, as defined by parameter n. Therefore, the minimum amount of alkylene oxide employed ranges between about 0.1 and about 10, and preferably between about 0.5 and about 6, mols per mol of anhydride reactant. The particularly preferred polyester polyol compositions of the present invention are those encompassed by general Formulas I–III in which the average value of n, and thus of m, p+q and m+p+q, is at least about one. Accordingly, most preferred practice comprises the use of the alkylene oxide and anhydride reactants in at least equimolar amounts. It is to be understood that alkylene oxide may be charged to the reaction zone in an amount relative to anhydride which exceeds the desired number of oxyalkylene units, although usually no more than a three-fold molar excess is employed. A convenient procedure for determining when the desired oxyalkylated product has been formed is by periodic measurement of the hydroxyl number of the reaction mixture during the course of the reaction.

The oxyalkylation reaction is effected in the presence of a catalyst including various basic catalysts and organotin compounds. Suitable basic catalysts include the oxides, hydroxides and organic salts of the alkali metal and alkaline earth metals. Such metal catalysts are typically illustrated by the following: lithium, sodium, potassium, calcium and barium hydroxides; lithium, sodium and potassium acetates; and magnesium, barium and calcium oxides. A second class of basic materials which may be employed as the oxyalkylation catalyst are amines, particularly tertiary amines. Illustrative of suitable amine catalysts are triethylamine, triethylenediamine, N,N,N',N'-tetramethylbutanediamine and the like. Another class of suitable catalysts are organotin compounds such as those described hereinbelow with reference to the formation of polyether urethane polymers. Particularly useful as promoters for the oxyalkylation reaction, as well as for the abovedescribed anhydride-polyhydric alcohol reaction, are the tin carboxylates such as stannous octoate, stannous oleate, stannous acetate, stannous laurate and dibutyltin dilaurate.

In effecting the anhydride-polyhydric alcohol and oxyalkylation reactions, the aforesaid catalysts may be used individually or any combination thereof may be employed. The amount of total catalyst employed may vary between about 0.01 and about 5 weight per cent, based on the weight of the anhydride reactant.

The oxyalkylation reaction, as well as the initial reaction of anhydride and polyhydric alcohol, is usually carried out under substantially anhydrous conditions and may be effected in the presence or absence of a diluent. When employed, suitable diluents include: aromatic hydrocarbons such as benzene, xylene and toluene; the various chlorinated benzenes such as, for example, chlorobenzene and ortho-dichlorobenzene; dimethoxyethylene glycol; dimethoxydiethyl ether; dioxane; dimethylformamide; dimethyl sulfoxide; or any other normally liquid material which is also liquid within the aforesaid temperature range and non-reactive under the reaction conditions.

The oxyalkylation is carried out under the aforesaid reaction conditions until substantially all of the free carboxyl groups have been reacted. This point is readily determined by periodic measurement of the acid number of the reaction mixture by conventional titration of aliquot samples with an aqueous sodium hydroxide solution, until the acid number is less than about 1 mg.KOH/gram. When the unsaturated polyester polyols of the present invention are to be brominated and the resulting bromination reaction product is to be utilized as a flame-retardant component of polyurethane reaction mixtures containing an amine catalyst, the oxyalkylation is conducted until the reaction mixture exhibits an acid number of less than about 0.5 mg.KOH/gm. Upon completion of the reaction, the reaction product containing the unsaturated ester polyols of the present invention is recovered and may be used as such, removing catalyst and any volatile components, as desired, by conventional separation techniques.

The novel flame-retarding agents of the present invention are provided as the corresponding brominated reaction products of the above-described unsaturated cycloaliphatic ester polyols. For example, bromination of diester diol A' and tetraester diol B' provides the corresponding brominated polyester diols designated as A'' and B'', respectively, as illustrated by the following equations (5) and (6):

Equation (5):

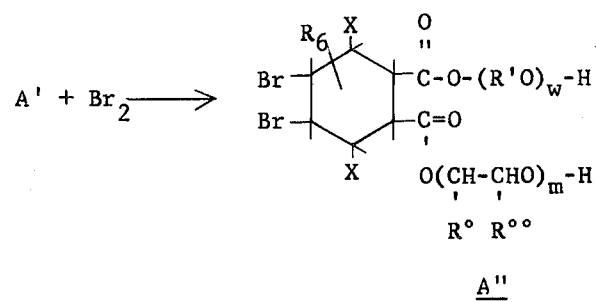

Equation (6):

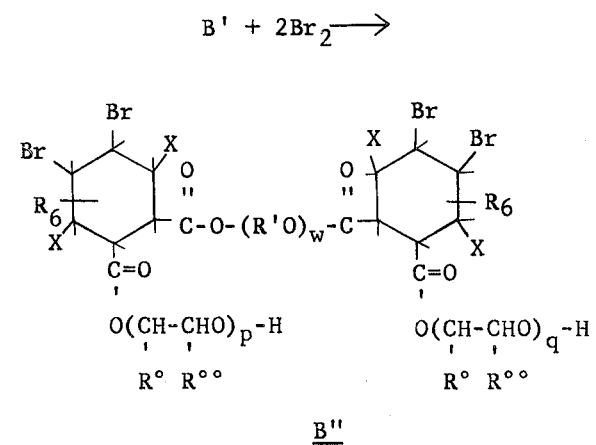

wherein R, R', R°, R°°, X, $w$, $m$ and $p+q$ have the aforesaid significance. When the unsaturated parent compounds A' and B' are produced as a mixed reaction product, the bromination reactions of equations (5) and (6) occur substantially concurrently to provide a mixture of A'' and B''. Such mixtures may contain the brominated diester and tetraester diols in any relative proportions and are suitably employed as flame-retarding agents as described herein.

The bromination of the parent unsaturated ester polyols is usually carried out at relatively low temperatures such as from about minus 15°C. to about plus 10°C. and proceeds at a satisfactory reaction rate at substantially atmospheric pressure. The reaction is preferably conducted in the substantial absence of light using about one mol of bromine per equivalent of olefinic unsaturation, although the reaction may be carried out using a slight deficiency of bromine. The bromination may be carried out in the presence or absence of a diluent or solvent. When used, suitable diluents include the halogen-substituted lower alkanes such as carbon tetrachloride, chloroform and methylene chloride, although other diluents which are liquid and substantially non reactive under the aforesaid conditions may be employed, such as trichloromonofluoromethane, 1,1,2-trichloro-1,2,2-trifluoroethane, benzene and the like. The brominated reaction product is recovered as the product remaining after removal of more volatile components or by other conventional techniques such as extraction. When the bromoester polyols of the present invention are to be used as the flame-retardant component of polyurethane reaction mixtures containing an amine catalyst, it is usual practice to treat the product, as required, to reduce the acid number thereof to a value less than about one and most preferably to less than about 0.5 mg.KOH/gram. This is accomplished, for example, by treatment with a strongly basic anion exchange resin to remove bromide ion. When a metal catalyst is employed in preparing the parent unsaturated polyols, this treatment also removes the anionic portion of any such remaining catalyst.

In addition to use as a flame-retardant of urethane polymers, the bromo-cycloaliphatic ester polyols of the present invention can also be used to impart flame-retardancy to other solid synthetic organic polymers which are normally susceptible to burning. Among such additional polymers are: thermosetting polyesters; polyepoxides; phenolics; thermoplastic polyesters; and polymers derived from ethylenically unsaturated monomers such as ethylene, propylene, styrene, alkyl-substituted styrenes, lower alkyl acrylates and methacrylates, vinyl acetate, and other resinous polymers well known to the art.

In providing flame-retarded polymers, the amount of bromo-cycloaliphatic ester polyol which is incorporated into any particular polymer composition depends on several factors including the degree of flame-retardancy desired, whether one or more additional flame-retarding agents are employed, the chemical composition of the polymeric material, the physical nature (i.e., cellular or non cellular), and, with respect to cellular polymers, the nature of the cellular structure (i.e., flexible, semiflexible or rigid). Generally, the polymer compositions of this invention including urethane polymers contain between about 2 and about 25 weight per cent of the bromo-cycloaliphatic ester polyols described herein.

The flame-retarded polyurethanes of the present invention comprise the reaction products of an organic polyisocyanate, one or more of the bromo-cycloaliphatic ester polyols described herein, and an additional polyol as a third type of reactant. The flame-retardant may be present in the urethane forming reaction mixture either as such or as a prepolymer formed by reaction of the flame-retardant with a polyisocyanate such as any of the polyisocyanates described hereinbelow. In accordance with either embodiment, the bromocycloaliphatic ester polyol is usually used in an amount to provide the polyurethane product with a bromine content of between about 1 and about 6 weight per cent, based on the combined weight of polyisocyanate and total polyol (that is, the bromo-cycloaliphatic ester polyol flame-retardant and additional polyol reactant). The aforementioned prepolymers are formed by reacting the flame-retardant of the present invention and polyisocyanate at a temperature between about 65°C. and about 85°C., in relative proportions sufficient to incorporate a predetermined amount of bromine within the aforesaid range into the final urethane polymer product.

The polyisocyanates used in the manufacture of polyurethanes are known to the art and any such reactants are suitably employed in producing the flame-retarded polyurethane compositions of this invention. Among the suitable polyisocyanates are those represented by the general formula:

wherein: $i$ has an average value of at least two, and Q' is an aliphatic, cycloaliphatic or aromatic radical which can be an unsubstituted hydrocarbyl group or a hydrocarbyl group substituted, for example, with halogen or alkoxy. For example, Q' can be an alkylene, cycloalkylene, arylene, alkyl-substituted cycloalkylene, alkarylene or aralkylene radical including corresponding halogen-substituted radicals. Typical examples of suitable polyisocyanates for use in preparing the flame-retarded polyurethanes of this invention are: 1,6-hexamethylene diisocyanate, 1,4-tetramethylene diisocyanate, 1-methyl-2,4-diisocyanatocyclohexane, bis(4-isocyanatophenyl)methane, phenylene diisocyanates such as 4-methoxy-1,3-phenylenediisocyanate, 4-chloro-1,3-phenylenediisocyanate, 4-bromo-1,3-phenylenediisocyanate, 5,6-dimethyl-1,3-phenylenediisocyanate, 2,4- and 2,6-tolylene diisocyanates, crude tolylene diisocyanate, 6-isopropyl-1,3-phenylenediisocyanate, durylene diisocyanate and triphenylmethane-4,4',4''-triisocyanate. Other suitable polyisocyanate reactants are etheylphosphonic diisocyanate and phenylphosphonic diisocyanate.

Also useful in the formation of the flame-retarded polyurethanes of this invention are the polyisocyanates of the aniline-formaldehyde polyaromatic type which are produced by phosgenation of the polyamine obtained by acid-catalyzed condensation of aniline with formaldehyde. Polyphenylmethylene polyisocyanates of this type are available commercially under such trade names as PAPI, NIAX Isocyanate AFPI, Mondur MR, Isonate 390P, NCO-120, Thanate P-220, NCO-10 and NCO-20. These products are low viscosity (50-500 centipoises at 25°C.) liquids having average isocyanato functionalities in the range of about 2.25 to about 3.2 or higher, depending upon the specific aniline-to-formaldehyde molar ratio used in the polyamine preparation. Other useful polyisocyanates are combinations of diisocyanates with polymeric isocyanates containing more than two isocyanate groups per molecule. Illustrative of such combinations are: a mixture of 2,4-tolylene diisocyanate, 2,6-tolylene diisocyanate and the aforesaid polyphenylmethylene polyisocyanates; and a mixture of isomeric tolylene diisocyanates with polymeric tolylene diisocyanates obtained as residues from the manufacture of the diisocyanates.

The amount of polyisocyanate employed varies slightly depending upon the nature of the polyurethane being prepared. In general, the polyisocyanates are employed in amounts that provide from 80 to 150 per cent, preferably from 90 to 120 per cent of the stoichiometric amount of the isocyanato groups required to react with all of the hydroxyl groups present in the other reactants of the polyurethane-producing reaction mixture, including the hydroxyl groups of: the bromocycloaliphatic ester polyols described herein, the additional polyol reactants described below, and any water which may be present as a source of blowing action.

In producing the flame-retarded urethane polymers of the present invention, one or more polyols is employed in addition to the bromocycloaliphatic polyols encompassed by Formulas I–III hereinabove. Such additional active hydrogen-containing compounds have an average of at least two hydroxyl groups per molecule and include compounds which consist of carbon, hydrogen and oxygen and compounds which also contain phosphorus and/or halogen. Suitable classes of such additional active hydrogen-containing compounds are polyether polyols, polyester polyols, lactone polyols and phosphorus-containing polyols.

Among the suitable polyether polyols that can be employed are the alkylene oxide adducts of water or any of the following polyhydroxyl-containing organic compounds: ethylene glycol; diethylene glycol; propylene glycol; dipropylene glycol; trimethylene glycol; butylene glycols; glycerol; 1,2,6-hexanetriol; 1,1,1-trimethyolethane; 1,1,1-trimethyolpropane; 3-(2-hydroxyethoxy)-1,2-propanediol; pentaerythritol; 1,2-cyclohexanediol; sobitol; sucrose; lactose; glycosides such as alpha-methylglucoside and alpha-hydroxyalkyl glucoside, fructoside and the like; compounds in which hydroxyl groups are bonded to an aromatic nucleus such as resorcinol, pyrogallol, phloroglucinol, di-, tri-, and tetra-phenylol compounds such as bis-(p-hydroxyphenyl)-methane and 2,2-bis-(p-hydroxyphenyl)-propane, and many other such polyhydroxyl compounds known to the art. The alkylene oxides employed in producing polyether polyols, which are also known as poly(oxyalkylene) polyols, usually have from 2 to 4 carbon atoms and are preferably ethylene oxide, propylene oxide or any combination thereof. In the preparation of mixed poly(oxyethylene-oxypropylene) polyols, the ethylene and propylene oxides may be added to the hydroxyl-containing reactant either in admixture or sequentially.

Among the suitable polyester polyols that can be employed in combination with the bromo-cycloaliphatic polyester polyols in producing the flame-retarded polyurethanes of the present invention are the reaction products of: (1) one or more of the aforesaid polyether polyols or one or more of the aforesaid polyhydroxyl-containing organic compounds which are reacted with alkylene oxide to produce such polyether polyols, and (2) a polyfunctional organic carboxylic acid including aliphatic and aromatic acids. Typical examples of suitable polycarboxylic acids that can be employed in producing polyester polyols are: succinic, adipic, sebacic, azelaic, glutaric, pimelic, malonic and suberic acids; and aromatic acids such as phthalic, terephthalic and isophthalic acids and the like.

Other suitable polyols for use in the manufacture of the flame-retarded polyurethanes of this invention are; lactone-based polyols prepared by reacting a lactone such as epsilonicaprolactone or a mixture of epsilon-caprolactone and an alkylene oxide with a polyfunctional initiator such as a polyhydric alcohol, an amine, or an aminoalcohol; and phosphorus-containing polyols such as the alkylene oxide adducts of phosphoric acid, polyphosphoric acids such as tri- and tetraphosphoric acids, organo-substituted phosphoric acids such as benzenephosphoric acid, and the like.

The particular additional polyol reactant or combination of polyols employed depends upon the end-use of the polyurethane product which in turn determines whether the product is to be provided as a flexible or rigid material. For this purpose, the polyol reactant is usually characterized by its hydroxyl number which is defined as the number of milligrams of potassium hydroxide required for the complete neutralization of the hydrolysis product of the fully acetylated derivative prepared from 1 gram of polyol or mixtures of polyols. The hydroxyl number can also be defined by the equation:

$$OH = \frac{56.1 \times 1000 \times f}{M.W.}$$

wherein

OH = hydroxyl number of the polyol $f$ = average functionality, that is, average number of hydroxyl groups per molecule of polyol M. W. = average molecular weight of the polyol In producing rigid polyurethanes, the polyol preferably possesses a hydroxyl number from about 200 to about 1000. In producing semi-flexible materials, the hydroxyl number is usually from about 100 to about 250. Lower hydroxyl numbers from about 32 to about 150 are usually appropriate for the polyols employed in producing flexible polyurethanes. These ranges of hydroxyl numbers are not intended to be restrictive but are merely presented as illustrative of the relatively large number of possible polyols and combinations thereof that can be employed.

The urethane-forming reaction is usually carried out in the presence of a minor amount of a catalyst comprising an amine. Suitable amine catalysts include one or more of the following: N-methylmorpholine; N-ethylmorpholine; N-octadecylmorpholine; triethylamine; tributylamine; trioctylamine; N,N,N'N'-tetramethylethylenediamine; N,N,N',N'-tetramethyl-1,3-butane-diamine; triethanolamine; N,N-dimethylethanolamine; triisopropanolamine; N-methyldiethanolamine; bis(2-dimethylaminoethyl)ether; hexadecylidimethylamine; N,N-dimethylbenzylamine; trimethylamine; triethylenediamine (i.e., 1,4-diazabicyclo[2.2.2]octane); the formate and other salts of triethylenediamine, oxyalkylene adducts of the amino groups of primary and secondary amines and other such amine catalysts which are well known in the art of polyurethane manufacture. The amine catalyst may be introduced to the polyurethane-producing reaction mixture as such or as a solution in suitable carrier solvents such as diethylene glycol; dipropylene glycol; and 2-methyl-2,4-pentanediol ("hexylene glycol").

The amine catalyst is present in the final urethane-producing reaction mixture in an amount of from about 0.05 to about 3 parts by weight of active catalyst (that is, the amine exclusive of other components present in solutions thereof) per 100 parts by weight of polyol.

In producing polyurethanes from polyether polyols it is often desirable to include as a further component of the reaction mixture a minor amount of certain metal catalysts. Such supplementary catalysts are well known to the urethane art. For example, useful metal catalysts include organotin compounds, particularly tin compounds of carboxylic acids such as stannous octoate, stannous oleate, stannous acetate, stannous laurate, dibutyltin dilaurate, and other such tin salts. Additional metal catalysts are organo-compounds of other polyvalent metals such as zinc and nickel (e.g., nickel acetylacetonate), or other such metal catalysts which are well known in the art of flexible polyether urethane foam manufacture. The amount of each such metal catalyst which can be present in the polyurethane-producing reaction mixture is from about 0.05 to about 2 parts by weight per 100 parts by weight of polyol.

When it is desired to provide the flame-retarded polyurethanes of this invention as cellular products, the polyurethane-forming reaction mixture also includes a minor amount of a foaming or blowing agent such as water which, upon reaction with isocyanate generates carbon dioxide in situ, or through the use of blowing agents which are vaporized by the exotherm of the reaction, or by a combination of the two methods. These various methods are known in the art. Thus, in addition to or in place of water, other blowing agents which can be employed in the process of this invention include methylene chloride, liquefied gases which have boiling points below 80°F. and above minus 60°F., or other inert gases such as nitrogen, carbon dioxide added as such, methane, helium and argon. Suitable liquefied gases include aliphatic and cycloaliphatic fluorocarbons which vaporize at or below the temperature of the foaming mass. Such gases are at least partially fluorinated and may also be otherwise halogenated. Illustrative of the fluorocarbon blowing agents are trichloromonofluoromethane, dichlorodifluoromethane, 1,1-dichloro-1-fluoroethane, 1,1,1-trifluoro-2-fluoro-3,3-difluoro-4,4,4-trifluorobutane, hexafluorocyclobutene and octafluorocyclobutane. When producing flexible foams, the generally preferred method of foaming is the use of water or a combination of water plus a fluorocarbon blowing agent such as trichloromonofluoromethane. On the other hand, in producing rigid foams the blowing agent is usually one of the aforesaid halogenated compounds.

The amount of blowing agent employed in the foaming reaction will vary with factors such as the density that is desired in the foamed product. Usually, however, from about 1 to about 30 parts by weight of the blowing agent per 100 parts by weight of polyol is employed.

In producing flame-retarded cellular polyurethanes in accordance with the method of this invention, a minor amount of a foam stabilizer is also usually present as an additional component of the polyurethane-forming reaction mixture. When used, the foam stabilizer is usually a poly(siloxaneoxyalkylene) block copolymer and may be any of such copolymers described in the art. Generally, the block copolymers comprise: (1) siloxy units having the formula, $Z_2SiO$, (2) polyether-substituted siloxy units having the general formula, $Z°O(C_nH_{2n}O)_xC_mH_{2m}Si(Z)O$, and (3) siloxy units having the formula, $Z_2SiO$, where: Z in each instance is a monovalent hydrocarbon group having from 1 to 12 carbon atoms such as alkyl and aryl groups, in particular methyl; $Z°$ is either Z, Z—C(O) or hydrogen wherein Z is as aforesaid; $-C_mH_{2m}-$ is a bivalent hydrocarbon radical, usually of 2 to 5 carbon atoms, that links the respective silicon atoms of the polyether-substituted siloxy units to the polyether block, $Z°O(C_nH_{2n}O)_x$, wherein $n$ has a value of from 2 to 4 and the average value of $x$ is such that the average molecular weight of the polyether block is from about 200 to about 6000. Illustrative block copolymers for use as foam stabilizers in the foaming reaction of this invention are, for example, the copolymers described in U.S. Pat. Nos. 2,834,748; 2,917,480; 3,505,377; 3,507,815; 3,563,924; and in U.S. patent application Ser. No. 109,587, filed Jan. 25, 1971, now abandoned. Such copolymer compositions are incorporated herein by reference to the aforesaid patents and application. When used, the foam stabilizer is present in the polyurethane-forming reaction mixture in an amount within the range of from about 0.2 to about 5 parts by weight or more, per 100 parts by weight of polyol.

The flame-retarded urethane polymers of the invention can take the form of foamed products, elastomers, surface coatings, castings and the like, and may be formed in accordance with any of the processing techniques known to the polyurethane art such as the "one-shot", quasi-prepolymer and prepolymer techniques. For example, in accordance with the "one-shot" process, foamed products are produced by carrying out the reaction of the polyisocyanate, the bromo-cycloaliphatic ester polyol flame retardants of the present invention (either as such or as a prepolymer with at least a portion of the polyisocyanate reactant) and the additional polyol, simultaneously with the foaming operation. In preparing the foamed products in accordance with the quasi-prepolymer technique, the polyisocyanate is first reacted with a portion of the above described second type of polyol reactant to give a product having a high percentage of free-NCO groups (e.g., from 20 to 50 per cent), and the product is subsequently foamed by reaction with additional polyol and foaming agent. In the prepolymer technique, the isocyanate is reacted with a slightly less than stoichiometric quantity of the second type of polyol to form a prepolymer having a low percentage (e.g., from 1 to 10 per cent) of free-NCO groups, followed by reaction of the prepolymer with a blowing agent such as water to form the cellular material. In view of their normally liquid nature, the brominated ester polyol flame-retardants described herein including the flame-retardant-/polyisocyanate prepolymers may be incorporated at any stage of these various multi-stage methods either as a separate stream or in combination with the second type of polyol reactant. Elastomers and castings are formed by reaction of the aforesaid prepolymer with a cross-linking agent having reactive hydrogens such as a diamine as typically exemplified by a bis-(aminochlorophenyl)methane. Curing of the prepolymer by atmospheric moisture provides surface coatings.

If desired, other additional ingredients can be employed in minor amounts in producing the polyurethane foams in accordance with the process of this invention. Illustrative of such additives that can be employed are: additional flame-retarding agents, cross-linking agents such as glycerol, triethanolamine and their oxyalkylene adducts, as well as fillers, dyes, pigments, anti-yellowing agents and the like.

The flame-retarded polyurethanes produced in accordance with the present invention are used in the same areas as conventional polyurethanes and are especially useful where improved fire resistance properties are beneficial. Thus the polymers are useful as textile interliners, cushions, mattresses, paddings, carpet underlay, packaging, gaskets, sealers, thermal insulators and the like.

It is to be understood that, although the preparation of polyurethanes has been described with specific reference to the formation of flame-retarded polyurethanes derived from the saturated bromine-substituted cycloaliphatic polyester polyols of the present invention, the unsaturated polyester polyols described herein including those encompassed by Formulas I-III, may also be employed to provide useful polyurethanes by reaction thereof with the above-described polyisocyanates, additional polyols, catalysts, foaming agents and stabilizers. In accordance with this embodiment, the unsaturated polyols are usually used in a minor amount such as, for example, an amount sufficient to provide between about 2 and about 25 weight per cent in the polymer product. Also included within the scope of the present invention are polyurethanes prepared from a combination of the unsaturated and bromine-substituted cycloaliphatic polyester polyols described herein.

The following examples are merely illustrative of the present invention and are not intended as a limitation upon the scope thereof.

Examples I and II typically illustrate preparation of the unsaturated cycloaliphatic polyester polyols of the present invention by reaction of tetrahydrophthalic anhydride, propylene glycol and propylene oxide as shown in Equations (7) and (8):

Equation (7):

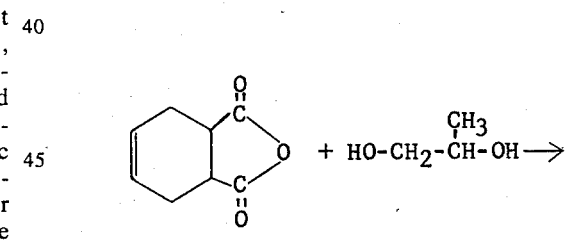

Equation (8):

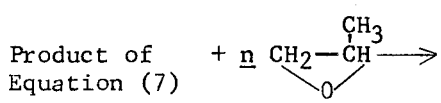

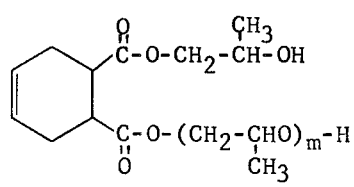

+

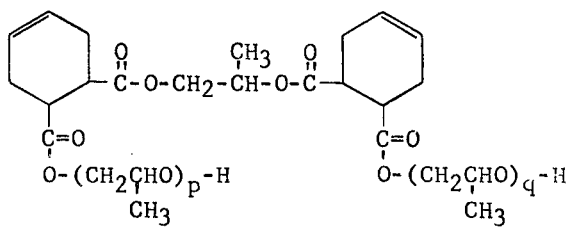

wherein the average value of the sum $m+p+q$ is about the same as the value of $n$.

EXAMPLE I

Propylene glycol (1140 grams; 15 mols) contained in a 5-liter, 4-necked reaction flask equipped with a mechanical stirrer, thermometer, dropping funnel and reflux condenser, was heated to 115°C. with agitation. Tetrahydrophthalic anhydride (1420 grams; 9.34 mols) was added portionwise during 15 minutes. When the addition was completed, the reaction mixture exhibited an exotherm to 145°C. during the subsequent 20-minute period. When the reaction temperature dropped back to 115°C., 2.0 grams of sodium acetate catalyst was added and the mixture was heated at 115°C. for one hour. Excess propylene glycol was separated at 120°C. and 3 mm. mercury pressure, the amount removed indicating that 8.94 mols of glycol had been consumed. Stannous octoate (0.50 gram) catalyst was then added to the reaction mixture, followed by the dropwise addition of propylene oxide at 115°C. until the acid number was nil. The propylene oxide addition took 34 hours during which a total of 12.4 mols had been added. The product remaining after removal of low boiling components by heating to 90°C. at 4 mm. mercury pressure for one hour weighed 2820 grams and, for convenience, is designated as Unsaturated Ester Diol I. The product contains an average total number of oxypropylene units ($n$) of about 1.33 mols per mol of tetrahydrophthalic anhydride and, upon analysis, was found to have the following properties:

| Acid No., mg. KOH/gm. | Nil |
|---|---|
| Brookfield Viscosity, cps. at 25°C. | 10,600 |
| Hydroxyl No., mg. KOH/gm. | 315.5 |

Based on formation of the diester diol of Equation (8) as essentially the sole product of the reaction and thus taking the value of $m$ as 1.33, calculated values of 305 and 368, respectively, are obtained as the molecular weight and hydroxyl number of the diester diol. Similarly, taking the value of $p+q$ as 1.33, the calculated molecular weight and hydroxyl number of the tetraester diol of Equation (8) are 457 and 246, respectively. Comparison of the calculated hydroxyl numbers (368 and 246) of the diester and tetraester diols individually with the determined hydroxyl number (315.5) of the reaction product, indicates that Unsaturated Ester Diol I is a mixture of the diester and tetraester diols.

EXAMPLE II

Propylene glycol (1140 grams; 15 mols) contained in a reaction flask as described in Example I was heated to 115°C. with agitation. Tetrahydrophthalic anhydride (1420 grams; 9.34 mols) was added portionwise during 15 minutes. When the addition was completed, the reaction mixture exhibited an exotherm to 161°C. during the subsequent 21-minute period. When the reaction temperature dropped back to 114°C., the mixture was heated to maintain a temperature of 115°C. and stannous octoate was added in 0.5 gram increments at one hour intervals until a total of 2.5 grams were added. Excess propylene glycol was separated at 120°C. and 3 mm. mercury pressure, the amount removed indicating that 9.52 mols of glycol had been consumed. Propylene oxide (37.75 mols) was then added at 115°–120°C. over a period of 33.25 hours. The product remaining after removal of low boiling components by heating to 90°C. at 5 mm. mercury pressure, weighed 4284 grams and is designated as Unsaturated Ester Diol II. The product contains an average total number of oxypropylene units ($n$) of about 4.04 mols per mol of tetrahydrophthalic anhydride and, upon analysis, was found to have the following properties:

| Acid No., mg. KOH/gm. | 0.062 |
|---|---|
| Brookfield Viscosity, cps. at 25°C. | 2,070 |
| Hydroxyl No., mg. KOH/gm. | 212.95 |

Based on formation of the diester diol of Equation (8) as essentially the sole product of the reaction and thus taking the value of $m$ as 4.04, calculated values of 462 and 243, respectively, are obtained as the molecular weight and hydroxyl number of the diester diol. Similarly, taking the value of $p+q$ as 4.04, the calculated molecular weight and hydroxyl number of the tetraester diol of Equation (8) are 614 and 183, respectively. Comparison of the calculated hydroxyl numbers (243 and 183) of the diester and tetraester diols individually with the determined hydroxyl number (212.95) of the reaction product, indicates that Unsaturated Ester Diol II is a mixture of the diester and tetraester diols.

Examples III and IV which follow typically illustrate preparation of the bromine-substituted cycloaliphatic polyester polyols of the invention by bromination of the reaction product of Equation (8), as shown below. Equation (9):

Product of Equation (8) + 3Br₂ → 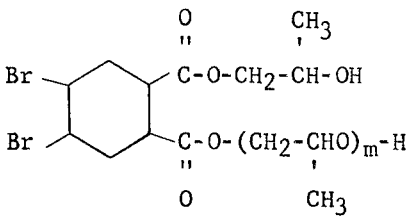

+ 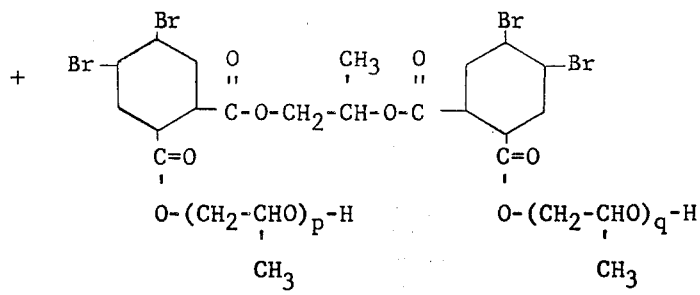

wherein the average value of the sum $m+p+q$ is about equal to the average number of oxypropylene units present in the product of Equation (8).

EXAMPLE III

Chloroform (1500 grams) and Unsaturated Ester Diol I (2610 grams; 9.0 equivalents of unsaturation) produced in accordance with Example I, were placed in a 5-liter, 4-necked reaction flask wrapped with aluminum foil to protect the contents from light and fitted with a thermometer, mechanical stirrer and dropping funnel. The contents were cooled to minus 5°C. and 1368 grams (8.57 mols) of bromine dissolved in 800 grams of chloroform were added dropwise during a period of 6.5 hours while maintaining the reaction temperature at minus 5°C. to 0°C. After allowing the reaction mixture to stand overnight at 25°C., the chloroform was removed therefrom at 45°C. and 5 mm. mercury pressure. The properties of the reaction product, designated as Brominated Ester Diol I, are as follows:

| | |
|---|---|
| Bromine Content, weight per cent | 38.29 |
| Acid No., mg.KOH/gram | 0.325 |
| Brookfield Viscosity, cps. at 25°C. | >2,000,000 |
| Hydroxyl No., mg.KOH/gram | 185 |

On the basis of the average number of oxypropylene units (1.33) present in parent Unsaturated Ester Diol I and taking the value of $m$ as 1.33, the calculated values of the molecular weight and hydroxyl number of the brominated diester diol shown in Equation (9) are 465 and 241, respectively. Similarly, taking the value of $p+q$ as 1.33, the calculated molecular weight and hydroxyl number of the brominated tetraester diol shown in Equation (9) are 777 and 144, respectively. Comparison of the calculated hydroxyl numbers (241 and 144) with the observed hydroxyl number (185), indicates that Brominated Ester Diol I is a mixture of the brominated diester and tetraester diols.

EXAMPLE IV

Employing the apparatus described in Example III, chloroform (1000 grams) and Unsaturated Ester Diol II (2037 grams; 4.4 equivalents of unsaturation) were cooled to 0°C. followed by the addition thereto of 704 grams (4.41 moles) of bromine dissolved in 500 grams of chloroform. The bromine solution was added dropwise during a period of 5 hours while maintaining the reaction temperature at minus 5°C. to 0°C. After allowing the reaction mixture to stand overnight at 25°C., the chloroform was removed therefrom at 50°C. and 4 mm. mercury pressure. The properties of the reaction product, designated as Brominated Ester Diol II, are as follows:

| | |
|---|---|
| Bromine Content, weight per cent | 26.04 |
| Acid No., mg.KOH/gram | 0.410 |
| Brookfield Viscosity, cps. at 25°C. | 62,000 |
| Hydroxyl No., mg.KOH/gram | 150.5 |

On the basis of the average number of oxypropylene units (4.04) present in parent Unsaturated Ester Diol II and taking the value of $m$ as 4.04, the calculated values of the molecular weight and hydroxyl number of the brominated diester diol shown in Equation (9) are 622 and 180, respectively. Similarly, taking the value of $p+q$ as 4.04, the calculated molecular weight and hydroxyl number of the brominated tetraester diol shown in Equation (9) are 934 and 120, respectively. Comparison of the calculated hydroxyl numbers (180 and 120) with the observed hydroxyl number (150.5), indicates that Brominated Ester Diol II is a mixture of the brominated diester and tetraester diols.

EXAMPLES V–XI

In accordance with these examples, polyurethane foams were prepared by reacting and foaming a reaction mixture containing a polyether polyol, a polyisocyanate, water as the source of blowing action, an amine catalyst, stannous octoate, a silicone surfactant as the foam stabilizer and, as the flame-retardant, the above-described Brominated Ester Diol I produced in accordance with Example III above. As control runs, polyurethane foams were also prepared in which either: (1) no flame-retardant was added (Run K), or (2) dibromoneopentyl glycol was incorporated (Runs K-1 and K-2). In each of Examples V–XI and Runs K, K-1 and K-2, the foam formulation contained the components identified in the following Table I wherein the relative proportions of each component are expressed on the standardized basis of 100 parts by weight of the indicated polyether polyol.

TABLE 1

FOAM FORMULATION A

| Component | Parts by Weight |
| --- | --- |
| Polyether Polyol having a hydroxyl number of 56 produced by reacting glycerol and propylene oxide | 100 |
| Tolylene Diisocyanate (Index 105) /1/ | Varied /3/ to obtain Index 105 |
| Bis-[2-(N,N-dimethylamino)ethyl] ether employed as a 70 weight per cent solution in dipropylene glycol | 0.1 |
| Water | 4.0 |
| Silicone Surfactant /2/ | 0.50 |
| Stannous Octoate | Varied /3/ |
| Flame-Retardant | Varied /3/ |

/1/ This component was a mixture of the 2,4- and 2,6-isomers of tolylene diisocyanate present in a weight ratio of 80:20, respectively. Index 105 designates that the amount of mixture employed was 105 weight per cent of the stoichiometric amount required to react with total reactive hydrogens from the polyether polyol, diol flame-retardant and water present in the foam formulation.

/2/ A polysiloxane-polyoxyalkylene block copolymer having the average formula:
MeO($C_3H_6O$)$_{29}$($C_2H_4O$)$_{20}$($CH_2$)$_3$|

$Me_3SiO(Me_2SiO)_{72}(MeSiO)_{5.1}SiMe_3$
(wherein "Me" represents a methyl group) employed as an approximately 55 weight per cent solution in a solvent medium containing about 90 and 10 weight per cent, respectively, of compounds having the average formulas, $C_4H_9(OC_2H_4)_{19}(OC_3H_6)_{14}OH$ and $C_9H_{19}C_6H_4(OC_2H_4)_{10.5}OH$.

/3/ The specific proportions employed are given in Table II herein.

The respective foams of Examples V–XI were prepared using the following procedure:

The diisocyanate and silicone surfactant were added to a preblend of Brominated Ester Diol I in the polyether polyol contained in a ½-gallon container fitted with a baffle. The resultant mixture was stirred for 60 seconds with a high speed stirrer at 2700 rpm. After the mixture was allowed to stand for 15 seconds, it was stirred for an additional 15 seconds. During the latter period but after 5 seconds had elapsed, the amine catalyst and water were added as a premixed solution and, after the remaining 10-second period of stirring, the stannous octoate was added from a syringe. When the 15 seconds of stirring was completed, the mixture was quickly poured into a mold (14 inches × 14 inches × 6 inches) whereupon the respective masses foamed. Both the cream time and rise time were recorded which terms denote the interval of time from the formation of the complete foam formulation to: (1) the appearance of a creamy color in the formulation, and (2) the attainment of the maximum height of the foam, respectively. The foams were allowed to stand at ambient conditions for 2 days before flammability, physical and mechanical properties were determined. The specific relative proportions of those components of Foam Formulation A which were varied and properties of the foamed products are given in Table II.

The above procedure was also followed in providing the control foam of Run K except, of course, that no flame-retardant was added.

In providing the foams of control Runs K-1 and K-2, the above procedure was also followed except that the dibromoneopentyl glycol was added to the reaction container as a preformed solution in the liquid polyether polyol. The latter solution was prepared by: (1) combining the dibromoneopentyl glycol and polyol in an amount sufficient ultimately to provide an 18 weight percent solution thereof in the polyether polyol; (2) heating the resulting suspension at about 70°C. for 1.5 hours to completely solubilize the dibromoneopentyl glycol; and (3) blending the resulting solution in a predetermined amount with additional polyether polyol to provide the relative proportion of dibromoneopentyl glycol per 100 parts by weight of polyol indicated in Table II.

The flammability properties, determined before and after accelerated aging, were measured in accordance with standard flammability test procedure ASTM D-1692-67 T, with the exception that five samples of each foam were tested. The results are given in Table II wherein:

"SE" indicates that on the basis of the results obtained in the aforesaid flammability test, the foam is rated as self-extinguishing.

"B" indicates that on the basis of the results obtained in the aforesaid flammability test, at least one of the five foam samples burned to such an extent tht it did not qualify as a self-extinguishing material; therefore, the foam is given a burning ("B") rating.

"Burning Extent" denotes the burned length of the test specimen of foam; the flammability of the foam is proportional to the burning extent as measured by this test.

"Extinguishing Time" denotes the time taken to give the specified "burning extent".

"Dry Heat Aging" indicates that the foam specimen was heated in an oven at 140°C. for 22 hours, as specified in test method ASTM D-1564-64 T, Sections 38–44.

In addition to flammability properties, Table II also indicates the density of each of the foamed products and various other physical and mechanical properties of the SE-rated foams which properties were measured by subjecting the foam samples to the following test procedures.

Density was measured as described in Sections 68–73 of ASTM D-1564-64 T, except that the test specimens had nominal dimensions of 4 inches × 4 inches × 1 inch.

Air Porosity, which is a comparative measurement of the degree of openness of the cells of flexible foams, was determined in accordance with the following test procedure: The test specimen of foam (4 inches × 4 inches × ½ inch) is compressed between two pieces of flanged plastic tubing (2 ¼ inches I.D.) of an air porosity assembly maintained under an air pressure of 14.7 pounds. Air is drawn through the thickness (½ inch) of the foam specimen at a velocity controlled to maintain a differential pressure of 0.1 inch of water across the thickness dimension. The air flow necessary to develop the requisite pressure differential is recorded and the air flow per unit area of the foam specimen is reported as the air porosity of the foam.

Tensile Strength and Ultimate Elongation were measured in accordance with Sections 81–87 (Suffix T) of ASTM D-1564-64 T, after exposure of the foam specimens to the above-described dry heat aging conditions, and are reported as the median values of three test specimens for each foam sample.

Tear Resistance was measured as described in Suffix G of ASTM D-1564-64 T and is reported as the median value of three test specimens for each foam sample.

Indentation Load Deflection (ILD Values) to 25% and 65% deflections were measured in accordance with ASTM D-1564-64 T, Sections 19-25 (Method A), except that dimensions of the foam specimens employed were 12 inches × 12 inches × 4 inches. The Return Value is the percentage ratio of the load required to support the return 25% indentation after one minute as compared to the load required to support the initial 25% indentation after one minute. The Load Ratio is the ratio of the 65% and 25% ILD values, respectively.

Compression Set at 90% constant deflection was determined in accordance with Sections 12-18 of ASTM D-1564-64 T, the amount of compression set ($C_t$) being expressed as a percent of the original specimen thickness and is reported as the median of three test specimens for each foam sample.

The results of Examples V–XI show that the brominated ester diols of the present invention provide flexible polyurethane foams having improved flame resistance as indicated by the slower rate at which each of the foamed products burned as compared with the burning rate of control foam produced in Run K. The results of Examples VI and VIII–XI further demonstrate that the flame-retardants of the present invention are capable of providing self-extinguishing flexible foams of overall good quality. The data of Table II also

TABLE II

| Example No. (Run No.) | (K) | (K-1) | (K-2) | V | VI | VII | VIII | IX | X | XI |
|---|---|---|---|---|---|---|---|---|---|---|
| Foam Formulation A | | | | | | | | | | |
| Diisocyanate, pts. by wt. | 49.8 | 53.3 | 54.6 | 52.3 | 53.3 | 54.1 | 54.9 | 55.9 | 56.6 | 57.6 |
| Stannous Octoate, pts. by wt. | 0.275 | 0.20 | 0.15 | 0.25 | 0.25 | 0.20 | 0.20 | 0.20 | 0.15 | 0.15 |
| Flame-Retardant, pts. by wt. | | | | | | | | | | |
| Brominated Ester Diol I /1/ | — | — | — | 9.0 | 11.5 | 14.25 | 17.0 | 19.75 | 22.70 | 25.70 |
| Dibromoneopentyl Glycol | — | 5.0 | 7.0 | — | — | — | — | — | — | — |
| Weight % Br in Polymer, Calcd. /2/ | 0 | 1.93 | 2.64 | 2.13 | 2.67 | 3.24 | 3.79 | 4.31 | 4.85 | 5.36 |
| Cream Time, seconds | 7 | 7 | 7 | 7 | 7 | 7 | 7 | 7 | 7 | 7 |
| Rise Time, seconds | 99 | 89 | 100 | 93 | 96 | 109 | 115 | 123 | 157 | 164 |
| Flammability by ASTM D-1692-67 T | | | | | | | | | | |
| *Before Sample Conditioning* | | | | | | | | | | |
| Rating | B | B /3/ | SE | B | SE | B | SE | SE | SE | SE |
| Burning Extent, inches | — | — | 3.4 | — | 4.1 | — | 3.6 | 3.0 | 3.3 | 2.8 |
| Extinguishing Time, seconds | — | — | 38 | — | 48 | — | 42 | 36 | 40 | 35 |
| Burning Rate, inches/min. | 6.4 | 5.3 | 5.35 | 5.23 | 5.20 | 5.26 | 5.05 | 5.0 | 5.0 | 4.73 |
| *After Dry Heat Aging* | | | | | | | | | | |
| Rating | — | — | SE | — | SE | — | B /4/ | SE | SE | SE |
| Burning Extent, inches | — | — | 2.5 | — | 3.8 | — | — | 3.0 | 3.5 | 3.7 |
| Extinguishing Time, seconds | — | — | 27 | — | 42 | — | — | 35 | 41 | 44 |
| Burning Rate, inches/min. | — | — | 5.46 | — | 5.32 | — | 4.92 | 5.15 | 5.10 | 4.98 |
| Foam Properties: | | | | | | | | | | |
| Density, lbs./ft.$^3$ | 1.55 | 1.53 | 1.54 | 1.66 | 1.68 | 1.72 | 1.75 | 1.78 | 1.87 | 1.87 |
| Air Porosity, ft.$^3$/min./ft.$^2$ | — | — | 81.2 | — | 86.1 | — | 107 | 85 | 117 | 114.5 |
| Tensile Strength, p.s.i. | — | — | 19.3 | — | 20.0 | — | 20.3 | 21.2 | 20.9 | 21.5 |
| Elongation, per cent | — | — | 194 | — | 206 | — | 211 | 214 | 215 | 213 |
| Tear Resistance, lbs./in. | — | — | 2.50 | — | 3.04 | — | 2.83 | 3.39 | 2.78 | 3.29 |
| 4-Inch ILD, lbs./50 in.$^2$ | | | | | | | | | | |
| 25% Deflection | — | — | 38 | — | 36 | — | 34 | 35 | 35 | 33 |
| 65% Deflection | — | — | 72 | — | 70 | — | 67 | 69 | 70 | 68 |
| 25% Return | — | — | 24 | — | 23 | — | 21 | 22 | 21 | 20 |
| Return Value | — | — | 63.7 | — | 63.4 | — | 62.8 | 62.2 | 59.7 | 59.8 |
| Load Ratio | — | — | 1.90 | — | 1.97 | — | 2.00 | 2.00 | 2.01 | 2.04 |
| 90% Compression Set, Per Cent | — | — | 84.6 | — | 79.5 | — | 91.3 | 11.4 | 10.3 | 17.6 |

/1/ By analysis, bromine content = 38.29 weight per cent.
/2/ In calculating these values, the total weight of the polymer was taken as the combined weight of diisocyanate, polyether polyol and flame-retardant employed.
/3/ Four out of five specimens tested were rated SE; average burning extent = 3.63 inches.
/4/ Four out of five specimens tested were rated SE; average burning extent = 3.38 inches.

TABLE III

| Example No. (Run No.) | (K-3) | | | XII | | | | | |
|---|---|---|---|---|---|---|---|---|---|
| Foam No. | 1 | 2 | 3 | 1 | 2 | 3 | 4 | 5 | 6 |
| Foam Formulation | | | | | | | | | |
| Flame-Retardant | DBNG /1/ | | | Brominated Ester Diol I /2/ | | | | | |
| Parts by Weight | 5.2 | 6.6 | 3.0 | 6.4 | 8.6 | 10.7 | 12.9 | 15.1 | 17.3 |
| Polyether Polyol /4,5/ | 100 | 100 | 100 | 93.6 | 91.4 | 89.3 | 87.1 | 84.9 | 82.7 |
| Diisocyanate /4,5/ | 53.4 | 54.4 | 55.4 | 51.0 | 51.6 | 52 | 52.5 | 53 | 53.4 |
| Stannous Octoate /5/ | 0.20 | 0.15 | 0.15 | 0.25 | 0.25 | 0.20 | 0.20 | 0.20 | 0.20 |
| Amine Catalyst /4,5/ | 0.1 | 0.1 | 0.1 | 0.1 | 0.1 | 0.1 | 0.1 | 0.1 | 0.1 |
| Water, pts. by wt. | 4.0 | 4.0 | 4.0 | 4.0 | 4.0 | 4.0 | 4.0 | 4.0 | 4.0 |
| Silicone Surfactant /4,5/ | 0.5 | 0.5 | 0.5 | 0.5 | 0.5 | 0.5 | 0.5 | 0.5 | 0.5 |
| Weight % Br in Polymer /6/ | 2.0 | 2.5 | 3.0 | 1.62 | 2.17 | 2.70 | 3.24 | 3.78 | 4.32 |
| Cream Time, seconds | 7 | 7 | 7 | 7 | 7 | 7 | 7 | 7 | 7 |
| Rise Time, seconds | 80 | 92 | 94 | 72 | 73 | 82 | 83 | 87 | 89 |
| Flammability | | | | | | | | | |
| Oxygen Index | 0.214 | 0.207 | 0.209 | 0.212 | 0.216 | 0.206 | 0.216 | 0.215 | 0.212 |

TABLE III-continued

| Example No. (Run No.) | | | XIII | | | |
|---|---|---|---|---|---|---|
| Foam No. | 1 | 2 | 3 | 4 | 5 | 6 |
| Foam Formulation | | | | | | |
| Flame-Retardant | Brominated Ester Diol II /3/ | | | | | |
| Parts by Weight | 9 | 12 | 15 | 18 | 21 | 24 |
| Polyether Polyol /4,5/ | 91 | 88 | 85 | 82 | 79 | 76 |
| Diisocyanate /4,5/ | 51.2 | 51.5 | 52.2 | 52.5 | 53.05 | 53.45 |
| Stannous Octoate /5/ | 0.25 | 0.25 | 0.20 | 0.20 | 0.20 | 0.20 |
| Amine Catalyst /4,5/ | 0.1 | 0.1 | 0.1 | 0.1 | 0.1 | 0.1 |
| Water, pts. by wt. | 4.0 | 4.0 | 4.0 | 4.0 | 4.0 | 4.07 |
| Silicone Surfactant /4,5/ | 0.5 | 0.5 | 0.5 | 0.5 | 0.5 | 0.5 |
| Weight % Br in Polymer /6/ | 1.55 | 2.06 | 2.57 | 3.07 | 3.58 | 4.07 |
| Cream Time, seconds | 7 | 7 | 7 | 7 | 7 | 7 |
| Rise Time, seconds | 81 | 79 | 88 | 86 | 90 | 95 |
| Flammability | | | | | | |
| Oxygen Index | 0.204 | 0.214 | 0.208 | 0.212 | 0.212 | 0.214 |

/1/ Dibromoneopentyl glycol.
/2/ Produced in accordance with Example III and containing 36.28 weight per cent bromine.
/3/ Produced in accordance with Example IV and containing 26.04 weight per cent bromine.
/4/ As identified in Table I.
/5/ Parts by weight.
/6/ In calculating these values, the total weight of the polymer was taken as th combined weight of diisocyanate, polyether polyol and flame-retardant employed.

show that the flammability properties of the polyurethane foams of this invention compare favorably with those of the foam produced in control Run K-2 in which the acyclic compound, dibromoneopentyl glycol, was used. The latter compound, however, suffers the drawback of being a normally solid material whereas the flame-retarding agents of the invention offer the processing advantage of being normally liquid.

EXAMPLES XII–XIII

In accordance with these examples, two series of flexible polyurethane foams were prepared employing Brominated Ester Diol I produced as described in Example III and Brominated Ester Diol II produced as described in Example IV. In carrying out these examples, as well as control Run K-3 in which dibromoneopentyl glycol was used as the flame-retardant, the procedure described with reference to the foam preparations of Table II was followed. The components of the foam formulation were the same as those identified in Table I above, the relative proportions thereof being given in Table III below. The latter table also presents flammability properties of the foamed products, as measured by Oxygen Index in accordance with test method ASTM D-2863-70. The Oxygen Index values given in Table III represent an average of three determinations on fresh samples (2 inches × ½ inch × 6 inches). Each foam sample was crushed and then allowed to reach equilibrium in the oxygen index device by allowing the sample to stand 2–3 minutes before testing.

Inasmuch as Oxygen Index indicates the minimum quantity of oxygen which is necessary to just sustain combustion of the foam sample, the higher the value of the Oxygen Index, the less flammable is the foam. The results of Table III further demonstrate, therefore, that the novel brominated ester diols of the present invention are effective in reducing the flammability of flexible polyurethane foams.

For the purpose of comparison, data are presented in Table IV below based on the use of a bromine-containing ester polyol derived from tetrabromophthalic anhydride, the said ester having been prepared as follows: To a previously dried 5-liter 4-necked reaction flask equipped with a stirrer, thermometer, dropping funnel and reflux condenser, there were added sodium acetate (2.4 grams) and 3,000 grams (about 1 mol) of a mixed propylene oxide-ethylene oxide adduct of glycerin having a hydroxyl number of about 60 mg. KOH/gram and containing a substantial proportion of primary hydroxyl end groups. The contents of the flask were kept under a positive pressure of dry nitrogen and heated to 100°C. Tetrabromophthalic anhydride (576 grams) was added portionwise during 25 minutes after which stannous octoate (2.1 grams) was added. The reaction mixture was heated for 5 hours at about 100°C. after which propylene oxide was added until the oxide began to reflux at which point 74 grams (1.22 mol) had been added. The reaction mixture was then heated at 83°C. and 1 mm. mercury pressure to remove volatile components. After filtering to remove a small amount of solid material, the liquid product was found to have the following properties:

| | |
|---|---|
| Bromine Content, Weight Per Cent | |
| Found | 11.91 |
| Calculated | 10.88 |
| Hydroxyl No., mg.KOH/g. (Average) | 42.8 |
| Acid No., mg.KOH/g. (Average) | 0.337 |
| Brookfield Viscosity, cps. at 25°C. | 1,832 |
| Gardner Color | 1 |

The reaction product, designated Brominated Ester Polyol Y, was employed as the flame-retardant component of a series of foam preparations employing the same procedure described above with reference to Examples V–XI. The composition of the respective reaction mixtures of these comparative runs (C-1 to C-3) and the results of flammability test ASTM D-1692-67 T are given in the following Table IV which also includes corresponding details for control foams (Run Nos. K-4 and K-5) in which dibromoeopentyl glycol was used as the flame retardant component.

TABLE IV

| Run No. | K-4 | K-5 | C-1 | C-2 | C-3 |
|---|---|---|---|---|---|
| Foam Formulation, Pts. by Wt. | | | | | |
| Flame-Retardant | | | | | |
| Dibromoneopentyl glycol | 2.5 | 6.0 | — | — | — |
| Brominated Ester Polyol Y | — | — | 28 | 42 | 56 |
| Polyether Polyol/1/ | 100 | 100 | 72 | 58 | 44 |
| Diisocyanate/1/ | 51.8 | 54.2 | 49.3 | 49.0 | 48.7 |
| Stannous Octoate/1/ | 0.2 | 0.2 | 0.25 | 0.25 | 0.25 |
| Amine Catalyst/1/ | 0.1 | 0.1 | 0.1 | 0.1 | 0. |
| Water | 4 | 4 | 4 | 4 | 4 |
| Silicone Surfactant/1/ | 0.5 | 0.5 | 0.5 | 0.5 | 0.5 |
| Weight Per Cent Br in Polymer/2/ | 0.99 | 2.29 | 2.23 | 3.36 | 4.48 |
| Flammability by ASTM D-1692-67 T | B | SE | B | B | B |

/1/As identified in Table I.
/2/In calculating these values, the total weight of the polymer was taken as the combined weight of diisocyanate, polyether polyol and flame-retardant employed.

The results of Table IV show that, unlike the bromine-containing cycloaliphatic ester polyols of the present invention, Brominated Ester Polyol Y did not provide self-extinguishing foams at bromine contents up to about 4.5 weight percent.

What is claimed is:

1. A method for producing flame-retarded cellular polyurethanes which comprises reacting and foaming a reaction mixture containing: (a) an organic polyisocyanate, (b) a mixture of bromine-substituted cycloaliphatic ester polyols, (c) a polyol different from said mixture of bromine-substituted cycloaliphatic ester polyols (b), and (d) a blowing agent, wherein the bromine-substituted cycloaliphatic ester polyols contained in said mixture thereof have the formulas,

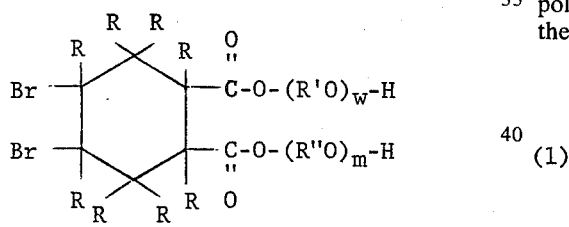

and

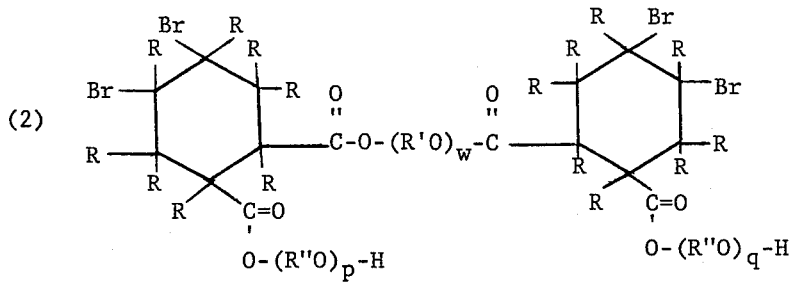

wherein R is hydrogen or an alkyl radical having from 1 to 6 carbon atoms; each of R' and R" is a bivalent alkylene group having from 2 to 10 carbon atoms; $w$ is a number having an average value of from about one to about 15; and $m$, $p$ and $q$ are positive numbers provided the average value of the sum $m+p+q$ is between about one and about 10.

2. A method as defined in claim 1 wherein each R is hydrogen, said polyol component (c) is a polyether polyol, and said reaction mixture additionally contains an amine catalyst for the polyurethane-forming reaction.

3. A flame-retarded cellular polyurethane produced by the method of claim 1.

4. A flame-retarded polyurethane having incorporated therein bromine-substituted cycloaliphatic ester polyols which comprise a mixture of compounds having the formulas, (1) 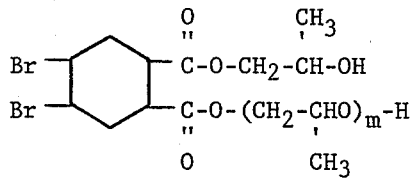

and (2) 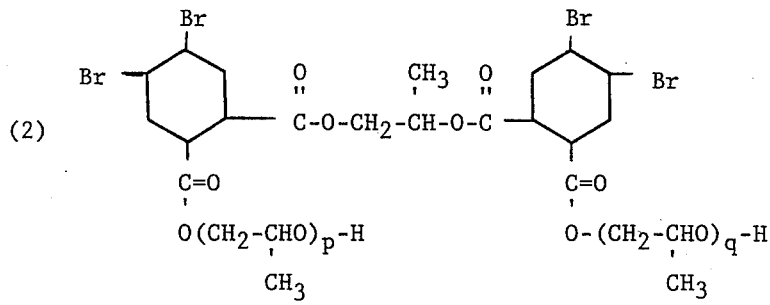

wherein $m$, $p$ and $q$ are positive numbers and the sum $m+p+q$ has an average value of from about 0.1 to about 10.

5. A flame-retarded polyurethane as defined in claim 4 wherein the sum $m+p+q$ has an average value from about 0.5 to about 6.

6. A method for producing flame-retarded cellular polyurethanes which comprises reacting and foaming a reaction mixture containing:
 1. an organic polyisocyanate;
 2. a mixture of bromine-substituted, saturated cycloaliphatic ester polyols which mixture is obtained by brominating the unsaturated ester polyols prepared from a monounsaturated cycloaliphatic carboxylic acid anhydride and a polyhydric alcohol under conditions such that a mixture of unsaturated esters having free carboxylic acid groups is provided, and subsequently reacting said mixture of unsaturated esters having free carboxylic acid groups with an alkylene oxide in such proportions that the resulting unsaturated ester polyols contain an average of from about 0.1 to about 10 moles of oxyalkylene units
 3. a polyol different from said mixture of bromine-substituted ester polyols (2); and
 4. a blowing agent.

7. A method as defined in claim 6 wherein said mixture of bromine-substituted, saturated cycloaliphatic ester polyols is obtained by brominating the unsaturated ester polyols prepared from tetrahydrophthalic anhydride as the monounsaturated cycloaliphatic carboxylic acid anhydride reactant, propylene glycol as the polyhydric alcohol reactant, and ethylene oxide, propylene oxide or a combination of ethylene oxide and propylene oxide as the alkylene oxide reactant.

8. A method as defined in claim 7 wherein the average number of moles of oxyethylene, oxypropylene or combination of oxyethylene and oxypropylene units is between about 0.5 and about six.

9. The method of claim 6 wherein said mixture of bromine-substituted cycloaliphatic ester polyols is present in said reaction mixture in an amount sufficient to provide a polyurethane product having a bromine content between about one and about 6 percent by weight, based on the combined weight of (1), (2) and (3).

10. The method of claim 6 in which the reaction mixture contains an amine catalyst for the polyurethane forming reaction.

11. The method of claim 6 in which the blowing agent comprises water.

12. The method of claim 6 in which component (3) is a polyether polyol.

13. The method of claim 6 in which component (3) is a polyester polyol.

14. The method of claim 6 in which component (3) is a lactone polyol.

15. The method of claim 6 in which component (3) is a phosphorus-containing polyol.

16. Flame-retarded cellular polyurethanes produced by the method of claim 6.

* * * * *

UNITED STATES PATENT OFFICE
CERTIFICATE OF CORRECTION

Patent No. 3,981,827     Dated September 21, 1976

Inventor(s) Anthony Joseph Papa et al.

It is certified that error appears in the above-identified patent and that said Letters Patent are hereby corrected as shown below:

Column 3, line 54, for "composition" read -- compositions --. Column 6, line 41, the formula reading "OR" should read "OR"

Column 6, line 66, for "cyclo" read -- cyclo- --. Column 9, line 61, for "m+p+Q" read -- m+p+q --. Column 13, line 47, for "etheylphosphonic" read -- ethylphosphonic --. Column 14, line 37, for "sobitol" read -- sorbitol --. Column 15, line 4, for "epsilonicaprolactone" read -- epsilon-caprolactone --; lines 54-55, for "hexadecylidimethylamine" read -- hexadecyldimethylamine --. Column 16, line 68, the formula reading $Z_2SiO$ should read $Z_2SiO_{1/2}$

UNITED STATES PATENT OFFICE
CERTIFICATE OF CORRECTION

Patent No. 3,981,827　　　　　　　　　Dated September 21, 1976

Inventor(s) Anthony Joseph Papa et al.

It is certified that error appears in the above-identified patent and that said Letters Patent are hereby corrected as shown below:

Column 24, line 28, for "tht" read -- that --. Columns 25-26, Table III, opposite the fifth of the left-hand legends reading "Parts by Weight", for the third numerical entry reading "3.0" read -- 8.0 --. Columns 27-28, Table III-continued, under the last column headed "6", the sixth numerical entry reading "4.07" should read -- 4.0 --; in the last line of footnotes, before "combined", "th" should read -- the --. Column 28, line 67, for "dibromoeopentyl" read -- dibromoneopentyl --. Column 29, Table IV, under column headed "C-3", for the sixth entry reading "0." read -- 0.1 --.

Signed and Sealed this sixteenth Day of August 1977

[SEAL]

Attest:

RUTH C. MASON
Attesting Officer

C. MARSHALL DANN
Commissioner of Patents and Trademarks